UNITED STATES PATENT OFFICE.

ERNEST A. WILDMAN, OF NEW YORK, N. Y., AND LAMBERT THORP, OF DETROIT, MICHIGAN, ASSIGNORS TO PARKE, DAVIS & COMPANY, OF DETROIT, MICHIGAN, A CORPORATION OF MICHIGAN.

ANESTHETIC BODIES AND METHOD OF PREPARING THE SAME.

1,193,649. Specification of Letters Patent. Patented Aug. 8, 1916.

No Drawing. Application filed April 17, 1916. Serial No. 91,825.

*To all whom it may concern:*

Be it known that we, ERNEST A. WILDMAN and LAMBERT THORP, both citizens of the United States of America, residing at New York, in the county and State of New York, and Detroit, Wayne county, Michigan, respectively, have invented certain new and useful Improvements in Anesthetic Bodies and Methods of Preparing the Same, of which the following is a specification.

The invention relates to the manufacture of synthetic bodies having anesthetic properties resembling cocain.

It is the object of the invention to obtain a body or series of bodies, which, while possessing strong anesthetic properties, are of a less toxic nature than the cocain.

We have discovered that a series of bodies, which may be broadly defined as aryl esters of gamma-dialkylamino propyl alcohols, have the desired anesthetic properties and are comparatively non-toxic. These bodies may be represented by the general formula:

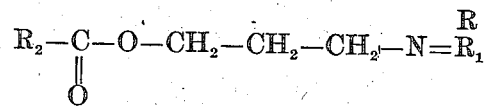

in which R and $R_1$ represent alkyl radicals which may be either alike or different, and $R_2$ represents any aryl radical or substituted aryl radical.

*General method of forming substances of this series.*—The gamma-dialkylamino propyl alcohol, dissolved in an inert solvent such as benzene, ether, acetone, etc., is allowed to react with an equivalent amount of the aromatic acid halid at the ordinary temperature. After the mixture has been allowed to stand until the separation of the product, namely, the salt of the aromatic ester of the gamma-dialkylamino propyl alcohol, is complete, the product is filtered and recrystallized from a suitable solvent. From the aqueous solution of the aforesaid salt the free basic ester,—namely, the aromatic acid ester of the gammo-dialkylamino propyl alcohol, may be precipitated by the addition of an alkali, such as potassium carbonate, for example, and separated by extraction with a suitable organic solvent, such as ether, for instance.

*A specific body.*—A specific body belonging to the general series of bodies as above defined is the cinnamic ester of gamma-diethylamino propyl alcohol, and we will describe the process of forming this body, which is as follows: Thirteen parts, by weight, of gamma-diethylamino propyl alcohol are dissolved in eighty parts, by weight, of benzene, and to this solution sixteen parts, by weight, of cinnamoyl chlorid are gradually added. The solution soon, more especially upon being cooled, deposits the hydrochlorid of gamma-diethylamino propyl cinnamate in the form of white crystals, readily soluble in water and having a melting-point of 137° centigrade after recrystallization from a mixture of alcohol and ether. From an aqueous solution of the aforesaid hydrochlorid a solution of potassium carbonate precipitates the free base, gamma-diethylamino propyl cinnamate as a colorless oil.

*Another specific body.*—Another specific body belonging to the series is the gamma-diethylamino propyl ester of para-toluic acid, which may be formed as follows: Thirteen parts, by weight, of gamma-diethylamino propyl alcohol are dissolved in eighty parts, by weight, of benzene, and to this solution are added gradually fifteen parts, by weight, of para-toluyl chlorid. Soon, more especially upon being cooled, the solution begins to deposit the hydrochlorid of the gamma-diethylamino propyl ester of para-toluic acid in the form of white crystals. This hydrochlorid is readily soluble in water and separates from its solution in a mixture of acetone and ether in the form of snow-white crystals which have a melting-point of 140° centigrade. From an aqueous solution of the aforesaid hydrochlorid a solution of potassium carbonate precipitates as a colorless oil the free alkamin ester, namely, the gamma-diethylamino propyl ester of para-toluic acid.

*Physical and chemical properties characteristic of the entire series.*—The aromatic acid esters of gamma-dialkylamino propyl alcohols are colorless compounds, oils or low-melting solids, readily soluble in alcohol, ether or benzene, very slightly soluble in water and of alkaline reaction toward litmus. The said esters form salts readily soluble in water. Upon heating with acids or alkalis the aforesaid esters are decomposed with formation of an aromatic acid and a gamma-dialkylamino propyl alcohol.

The specific body, the cinnamic ester of gamma-diethylamino propyl alcohol, is a colorless oil, very little soluble in water, readily soluble in ether, alcohol or benzene, of alkaline reaction to litmus, decomposed, when heated with hydrochloric acid or soda-lye, into cinnamic acid and gamma-diethylamino propyl alcohol, forming a salt with hydrochloric acid which crystallizes from a mixture of alcohol and ether in the form of white needles melting at 137° centigrade, the solution of which is possessed of anesthetic action.

What we claim as our invention is:—

1. As an anesthetic, a body of the series of aryl esters of gamma-dialkylamino propyl alcohols, being colorless compounds, oils or low-melting solids, readily soluble in alcohol, ether or benzene, very slightly soluble in water, of alkaline reaction toward litmus, decomposed when heated with acids or strong alkalis into aromatic acids and gamma-dialkylamino propyl alcohols, forming salts with acids, which salts are readily soluble in water, whose solution is possessed of anesthetic action and whose toxicity is slight in comparison with cocaine.

2. As an anesthetic, the cinnamic ester of gamma-diethylamino propyl alcohol, being a colorless oil, readily soluble in alcohol, ether or benzene, very slightly soluble in water, of alkaline reaction toward litmus, decomposed when heated with hydrochloric acid or soda-lye into cinnamic acid and a gamma-diethylamino propyl alcohol, forming a salt with hydrochloric acid, which salt is readily soluble in water and which crystallizes in a mixture of alcohol and ether in the form of white needles, melting at 137° centigrade, the solution of which is possessed of anesthetic action and whose toxicity is slight in comparison with cocaine.

3. The method of forming aromatic esters of gamma-dialkylamino propyl alcohol, comprising the dissolving of the gamma-dialkylamino propyl alcohol in an inert solvent, such as benzene, ether, acetone, etc., treating the same with an equivalent amount of an aromatic acid halid, and removing the product by filtration.

4. The method of forming the cinnamic ester of the gamma-diethylamino propyl alcohol, comprising the dissolving of gamma-diethylamino propyl alcohol in an inert solvent, such as benzene, ether, acetone, etc., gradually adding to the solution an equivalent weight of cinnamoyl chlorid, and removing the crystalline product,—namely, the hydrochlorid of the cinnamic ester of gamma-diethylamino propyl alcohol, by filtration, from whose solution in water the free base,—namely, the gamma-diethylamino propyl cinnamate may be precipitated as an oil by the addition of a solution of potassium carbonate.

In testimony whereof we have hereunto affixed our signatures.

ERNEST A. WILDMAN.
LAMBERT THORP.